(12) United States Patent
Lunnerhag et al.

(10) Patent No.: US 10,562,735 B2
(45) Date of Patent: Feb. 18, 2020

(54) STOP BALL

(71) Applicant: CEJN AB, Skövde (SE)

(72) Inventors: Anders Lunnerhag, Skövde (SE);
Lena Henåker, Skövde (SE); Filip Åkesson, Skövde (SE)

(73) Assignee: CEJN AB, Skövde (SE)

( * ) Notice: Subject to any disclaimer, the term of this patent is extended or adjusted under 35 U.S.C. 154(b) by 24 days.

(21) Appl. No.: 15/950,714

(22) Filed: Apr. 11, 2018

(65) Prior Publication Data

US 2018/0297812 A1    Oct. 18, 2018

(30) Foreign Application Priority Data

Apr. 18, 2017  (EP) .................................. 17166727

(51) Int. Cl.
  *B65H 75/44*  (2006.01)
  *F16L 11/00*  (2006.01)

(52) U.S. Cl.
  CPC ..... *B65H 75/4428* (2013.01); *B65H 75/4426* (2013.01); *F16L 11/00* (2013.01); *B65H 2701/33* (2013.01)

(58) Field of Classification Search
  CPC ............ B65H 75/4426; B65H 75/4428; B65H 2701/33; F16L 11/00
  USPC ......................................... 138/106
  See application file for complete search history.

(56) References Cited

U.S. PATENT DOCUMENTS

| 5,771,934 | A  | * | 6/1998  | Warshawsky ......... E03C 1/0401 137/801 |
| 6,161,943 | A  |   | 12/2000 | Chang |
| 6,250,338 | B1 | * | 6/2001  | Dempsey ................. E03C 1/04 137/801 |
| 6,460,570 | B1 | * | 10/2002 | Jones ........................ E03C 1/04 137/801 |
| 6,915,817 | B2 | * | 7/2005  | Benstead ................. E03C 1/04 137/355.25 |
| 7,143,780 | B1 | * | 12/2006 | Pitts ........................ F16K 27/12 137/382 |
| 8,578,562 | B2 | * | 11/2013 | Liu ........................... E03C 1/04 137/801 |
| 9,145,664 | B2 | * | 9/2015  | Yuan ........................ E03C 1/04 |
| 9,234,335 | B2 | * | 1/2016  | Thomas ................... E03C 1/04 |
| 9,528,250 | B2 | * | 12/2016 | Nelson ..................... E03C 1/04 |
| 10,161,116 | B2 | * | 12/2018 | Frye ......................... E03C 1/04 |

(Continued)

FOREIGN PATENT DOCUMENTS

EP         0493736 A2 *  7/1992  ............ B65H 75/44
JP         2018105412 A   7/2018
WO    WO-2012032486 A1   3/2012

*Primary Examiner* — Craig M Schneider
*Assistant Examiner* — David R Deal
(74) *Attorney, Agent, or Firm* — Winstead PC

(57) ABSTRACT

A stop ball for a tube for fluid or energy is provided. The stop ball comprises a singular hollow body. The hollow body comprises and is integral with a first opening for the tube and an attachment means for attaching the stop ball to the tube, the attachment means comprising a second opening for the tube. A method for attaching a stop ball according to any one of the preceding embodiments to a tube for fluid or energy is provided. The method comprising inserting the tube through all three openings; pulling the attachment means at least partly out of the hollow body; and clamping the attachment means onto the tube.

12 Claims, 3 Drawing Sheets

(56) References Cited

U.S. PATENT DOCUMENTS

| | | | |
|---|---|---|---|
| 10,273,126 B1* | 4/2019 | Huang | B66D 1/28 |
| 2014/0111158 A1* | 4/2014 | Kinomura | H02G 3/0493 |
| | | | 320/109 |
| 2018/0319621 A1* | 11/2018 | Sevigny | B65H 75/486 |

* cited by examiner

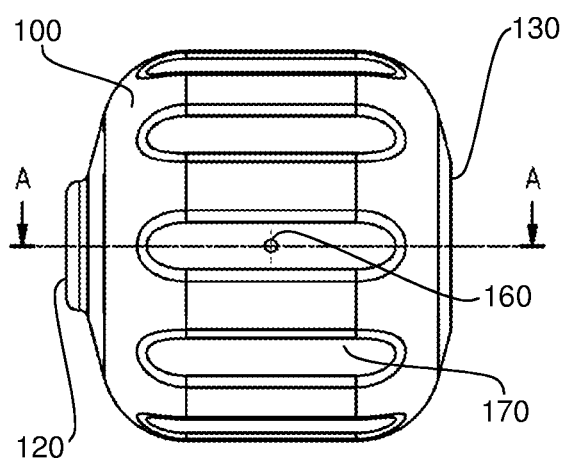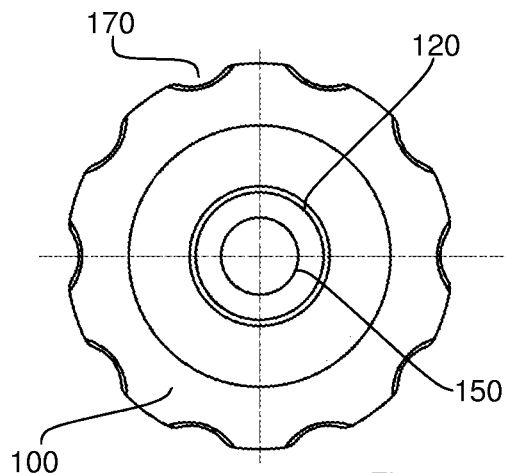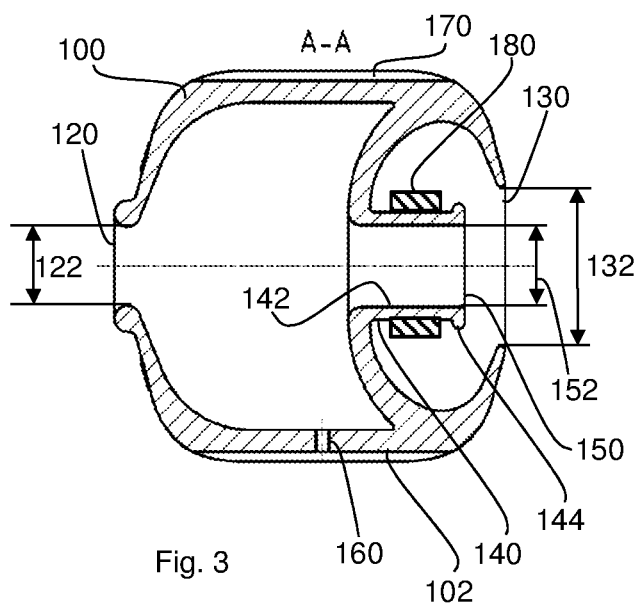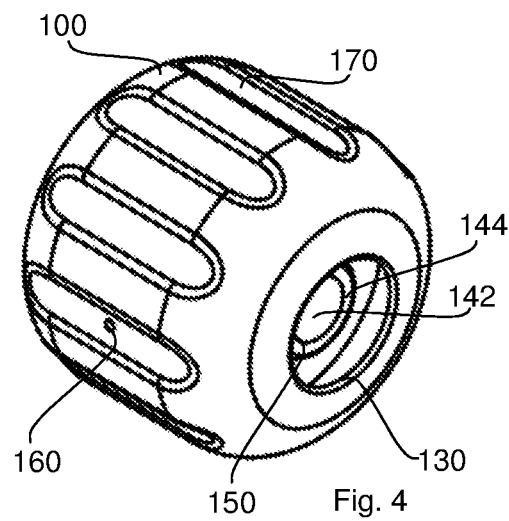

STOP BALL

TECHNICAL FIELD

The present disclosure relates to stop balls. More particularly, the present disclosure relates to a stop ball for tubes and hoses and similar elongate flexible bodies, a method of how to attach such a stop ball to a tube or hose, and a tool for moulding the stop ball.

BACKGROUND

Hose reels are used for reeling, winding, up a tube or hose. To stop the hose reel to wind up all of the tube a stop ball is used. By using a stop ball the tube or hose does not completely disappear inside the hose reel. Where a use of fluid, for example compressed air, is needed a hose supplying the fluid is reeled up so that the hose is stored and kept safe. The hose is reeled out as much as is needed and subsequently reeled up until the stop ball interacts with the hose reel when stored away.

Stop balls are made of two solid halves that are bolted together around a tube or hose. Such stop balls have several drawbacks. For example, they are hard. Personal injury may occur when stepping on such a stop ball lying on the floor. Such stop balls are specifically made for a tube or hose with a specific diameter. Hard solid stop balls may cause injury to personnel, equipment, or a hose reel. Stop balls are cumbersome to attach to a tube because they consist of many parts. It is therefore desirable to overcome these problems and improve stop balls and their interaction with a tube, hose, or hose reel.

It is also desirable to provide a stop ball that is inexpensive to manufacture, is easy to manufacture, and is robust. The stop ball must also be able to provide a good, functional, and reliable stop. The present disclosure is directed to overcoming one or more of the problems as set forth above.

SUMMARY OF THE INVENTION

It is an object of the present invention to provide a stop ball for a tube for fluid or energy, and a method for attaching such a stop ball to a tube for fluid or energy, and a tool for moulding the stop ball. This object can be achieved by the features as defined by the independent claims. Further enhancements are characterised by the dependent claims.

According to one embodiment, a stop ball for a tube for fluid or energy is provided. The stop ball comprises a singular hollow body. The hollow body comprises and is integral with a first opening for the tube and an attachment means for attaching the stop ball to the tube, the attachment means comprising a second opening for the tube.

According to one embodiment, the hollow body further comprises and is integral with a third opening for the tube. The third opening has a third diameter. The first opening has a first diameter. The second opening has a second diameter, the second diameter being smaller than at least one of the first diameter and the third diameter.

According to one embodiment, the third diameter is larger than each of the first diameter and the second diameter.

According to one embodiment, the attachment means is at least partially inside the hollow body.

According to one embodiment, the attachment means comprises an area for radial clamping of the area on to the tube. Preferably, the area has a constant diameter followed by a flange. The area may have the second diameter.

According to one embodiment, the hollow body further comprises one or more radial openings. The one or more opening may be in the radial orientation.

According to one embodiment, the hollow body is flexible, allowing a flexibility of over 100 percent.

According to one embodiment, the hollow body further comprises structural configurations to strengthen the hollow body.

According to one embodiment, the hollow body, between an outer side of the hollow body and the attachment means, extends inwardly and/or outwardly in an axial direction of the stop ball.

According to one embodiment, the stop ball further comprises clamping means for the attachment means. The clamping means may be one of the following group consisting of a cable tie, hose clamp, elastic means, mechanical clamp, and tie for clamping the attachment means onto the tube.

According to one embodiment, a method for attaching a stop ball according to any one of the preceding embodiments to a tube for fluid or energy is provided. The method comprising inserting the hose through all three openings; pulling/moving the attachment means at least partly out of the hollow body; and clamping the attachment means onto the tube.

According to one embodiment, the method further comprises using at least one of the following group consisting of a cable tie, hose clamp, elastic means, mechanical clamp, and tie for clamping the attachment means onto the tube.

According to one embodiment, the method further comprises inflating the hollow body; moving the stop ball along the tube while the hollow body is inflated; and deflating the hollow body to attach the stop ball on the tube.

According to one embodiment, a tool configured to mould the stop ball according to any one of the above embodiments is provided. The tool comprises two volumes, each volume being adapted to be pulled out from the first opening (120) and the third opening (130), respectively, for injection moulding the stop ball in one single moulding step.

One or more embodiments disclosed herein provide a stop ball not causing injuries when stepped upon and a stop ball that fit tubes with different diameters. At least one embodiment provides a stop ball that is inexpensive to manufacture, is easy to manufacture, and is robust. At least one embodiment provides a stop ball that has good dampening qualities. At least one embodiment provides a method for attaching such a stop ball easily to a tube, excluding the use of bolts.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any feature disclosed herein mat be added, combined or removed from any disclosed embodiment. Any claimed embodiment disclosed herein may be technically combined with any other claimed embodiment or embodiments disclosed herein.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

FIG. 1 is a diagrammatic illustration of a stop ball according to an exemplary embodiment of the present disclosure;

FIG. 2 is a diagrammatic illustration of a stop ball according to an exemplary embodiment of the present disclosure;

FIG. 3 is a diagrammatic illustration of a stop ball according to an exemplary embodiment of the present disclosure and according to section A-A in FIG. 1;

FIG. 4 is a diagrammatic illustration of a stop ball according to an exemplary embodiment of the present disclosure;

DETAILED DESCRIPTION

Figure 5:
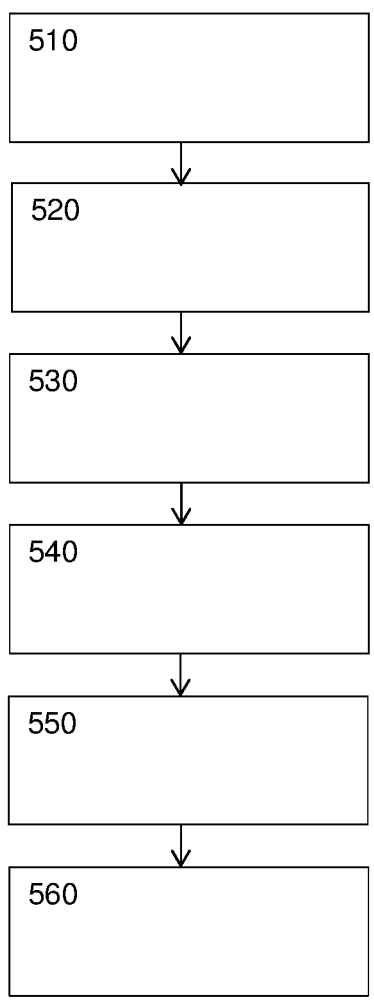
FIG. 5 is a diagrammatic illustration of a method for connecting a hose to the hose reel according to an exemplary embodiment of the present disclosure.

FIGS. 1-4 are diagrammatic illustrations of a stop ball according to an exemplary embodiment. The stop ball is for a tube for fluid or energy. The tube may be a hose, a cable, an elongate body, or an elongate flexible, hollow, body. Such a tube may conduit a fluid, such as for example air, gas, compressed air, compressed gas, liquid, water, or fuel. The tube may lead energy, such as for example electricity or light.

The stop ball comprises a singular hollow body (100) as illustrated in FIGS. 1-4. The hollow body (100) comprises, and is integral with, a first opening (120) for the tube and an attachment means (140) for attaching the stop ball to the tube. The attachment means (140) comprises a second opening (150) for the tube. The hollow body (100) may be a single hollow body made continuously of the same material throughout the hollow body (100). The hollow body (100) is not put together of two or more parts, or two or more materials. The hollow body (100) is only one integral singular part. The hollow body (100) is preferably moulded, for example injection moulded, in one single step.

According to one embodiment, the hollow body (100) is made out of a flexible material. Preferably the hollow body (100) is substantially a cylindrical body, a cylindrical body with rounded edges, a sphere-shaped body, a ball, a balloon, a roundish shape, round, or an approximation thereof.

According to one embodiment, the hollow body (100) comprises a substantially uniform circumferential. Preferably the hollow body (100) does not include a sectional cut into its centre. According to one embodiment, a radial cut through the hollow body (100) is consistent; it does not include an opening. According to one embodiment, the hollow body (100) is uniform and two halves of the hollow body (100) are mirrored when the hollow body (100) is cut along the axial direction of the hollow body (100), except for one or more openings (160).

According to one embodiment, the hollow body (100) further comprises, and is integral with, a third opening (130) for the tube, the third opening (130) having a third diameter (132); the first opening (120) having a first diameter (122); and the second opening (150) having a second diameter (152). The second diameter (152) being smaller than at least one of the first diameter (122) and the third diameter (132).

According to one embodiment, the first opening (120), the second opening (150), and the third opening (130) are all on the same central axis of the stop ball. A central axis of a hose connected to the stop ball would coincide with the central axis of the stop ball and each opening.

According to one embodiment, the third diameter (132) is larger than each of the first diameter (122) and the second diameter (152). According to one embodiment, the third diameter (132) is larger than only the second diameter (152). According to one embodiment, each of the diameters are smaller than the diameter of the hollow body (100).

According to one embodiment, the second opening (150) is where the stop ball is clamped onto the tube, and therefore the first opening (120) and the third opening (130) have larger diameters (122, 132) then the second diameter (153). In this way the stop ball can be extended and compressed when the stop ball gets pulled or stopped, in either direction. It is an advantage to have the third diameter (132) large enough to allow a user to clamp the stop ball onto a tube with a clamping means (180) around the attachment means (140). Preferably the hollow body (100) is flexible enough to be allowed to be pulled aside (pulling the third opening (130) to the left in FIG. 3) to allow access to the clamping means (180). Alternatively, the hollow body (100) is flexible enough to allowed the attachment means (140) to be pulled out of the third opening (130) to allow access to the clamping means (180) around the attachment means (140).

According to one embodiment, a stop ball for a tube comprises a hollow body (100). The hollow body (100) comprises a first opening (120) for the hose, the first opening (120) having a first diameter (122); a third opening (130) for the hose, the third opening (130) having a third diameter (132); and an attachment means (140) for attaching the stop ball to the hose, the attachment means (140) comprising a second opening (150) for the hose, the second opening (150) having a second diameter (152), the second diameter (152) being smaller than at least one of the first diameter (122) and the third diameter (132). Preferably, the first opening (120), the second opening (150), and the third opening (130) are all on the same central axis of the stop ball. Preferably, the third diameter (132) is larger than the first diameter (122) and/or the third diameter (152).

According to one embodiment, the hollow body (100) is made out of a flexible material. Preferably the hollow body (100) is substantially a cylindrical body, a cylindrical body with rounded edges, a sphere-shaped body, a ball, a balloon, a roundish shape, round, or an approximation thereof. According to one embodiment, the hollow body (100) comprises a substantially cylindrical body with an oval body attached inside to one end, and with central openings going axially through each three sides, see FIG. 3.

According to one embodiment, a stop ball for a hose consists of the hollow body (100) described herein and the clamping means (180) described herein. Such a stop ball with a clamping means (180) only has two parts and is therefore easy to handle. For example, the clamping means may be a cable tie.

According to one embodiment, the attachment means (140) is at least partially inside the hollow body (100). Preferably, the attachment means (140) is completely inside the hollow body (100), i.e. the attachment means (140) does not stick outside the hollow body (100). This allows the attachment means (140) and the clamping means (180) to be inside and protected by the hollow body (100). Preferably, the attachment means (140) and the clamping means (18)0 are visible inside the hollow body (100) when viewed through the third opening (130). According to one embodiment, the attachment means (140) may be moved out of the hollow body (100) through the first or second openings. This gives access to the clamping means (140).

According to one embodiment, the attachment means (140) comprises an area (142) for radial clamping of the area (142) on to a tube. Preferably, the clamping is circumferential radial clamping of the area (142) on to the tube. Preferably, the area (142) has a constant diameter followed by a flange (144). The flange (144) may be at an end of the area (142), for example the end closes to the third opening (130). The flange (144) preferably ensures that the camping means (180) stays on the attachment means. According to one embodiment, the attachment means (140) comprises one flange (144) at one end and a radial extension to the side wall of the hollow body (100) on the opposite end.

According to one embodiment, the hollow body (100) further comprises one or more radial openings (160). The exemplary illustrations, FIGS. 1, 3, and 4, show only one radial opening (160). The radial opening (16) may be for inflating the hollow body and/or for allowing air to escape the hollow body (100). The radial opening (16) may be only 1-3 millimetres in diameter, preferably 1.5 millimetres. The hollow body (100) may have a single or a plurality of radial openings (16). The radial opening (16) may provide an extra passage for air to leave, or enter, the inside of the stop ball when the stop ball dampens a tube reeled in.

According to one embodiment, the hollow body (100) is flexible, allowing a flexibility of over 100 percent. The stop ball is preferably able to fit tight onto a tube with a diameter of 9.5 millimetres and extend up to a tube with a diameter of 18 millimetres. According to one embodiment, the material for the hollow body (100) of the stop ball is chloroprene with a hardness shore of 50. This choice of material and flexibility achieves technically a stop ball that can be moulded in one step and a stop ball that is not too hard or too soft and achieves stopping, dampening, the tube being reeled up without damaging the hose reel or the tube. According to one embodiment, the flexibility may be over 200 percent, or over 300 percent, or over 400 percent, or over 500 percent.

According to one embodiment, the hollow body (100) further comprises structural configurations (170) to strengthen and/or weaken the hollow body (100). The structural configurations (170) may be protrusions or recesses to solidify and/or to soften the structure of the hollow body (100). The structural configurations (170) may provide a stop ball that stops, dampens, the tube when being reeled up without damaging the hose reel or the tube.

According to one embodiment, the hollow body (100), between an outer part (102) of the hollow body (100) and the attachment means (140), extends and inwardly and/or outwardly in an axial direction of the stop ball. This extension connects radially the attachment means (140) with the radial side of the hollow body (100). Preferably the hollow body extends in an S-shape, Z-shape, I-shape, L-shape, C-shape, or T-shape when viewed from a cut in the radial and axial plane of the stop ball, as shown by FIG. 3. Such extensions between the outer part of the hollow body (100) and the attachment means (140) for the tube may provide a stop ball that stops, dampens, the tube when being reeled up without damaging the hose reel or the tube.

According to one embodiment, the stop ball further comprises clamping means (180) for the attachment means (140). The clamping means (180) may be, for example, a cable tie, a hose clamp, or similar. The clamping means (180) may be at least one of the following group of clamping means consisting of a cable tie, hose clamp, elastic means, mechanical clamp, and tie. Such a clamping means (180) may be used for clamping the attachment means (140) onto a tube. According to one embodiment, the stop ball consists of the hollow body (100) and the clamping means (180), such as for example a cable tie (180); no other parts.

According to one embodiment, the clamping means (180) goes around the attachment means (140) and clamps the attachment means (140) radially and/or circumferentially on to a tube.

FIG. 5 is a flow chart of an exemplary method according to one embodiment. According to one embodiment, the method describes how to attach the stop ball, according to any embodiment disclosed herein, to a tube for fluid or energy. The method comprises a first step: inserting (510) the hose through all three openings; followed by a second step: pulling (520) the attachment means (140) at least partly and relatively out of the hollow body (100); and followed by a third step: clamping (530) the attachment means (140) onto the tube. The second step (520) may be done before the first step (510).

According to one embodiment, the method may further comprise using at least one of the following group of clamping means comprising or consisting of a cable tie, hose clamp, elastic means, mechanical clamp, and tie for clamping the attachment means (140) onto the tube. According to one embodiment, the stop ball consists therefore simply of the hollow body (100) and the clamping means (180), such as for example a cable tie (180); no other parts.

According to one embodiment illustrated by FIG. 5, the method may further comprise inflating (540) the hollow body (100); moving (550) the stop ball along the tube while the hollow body (100) is inflated; and deflating (560) the hollow body (100) to attach the stop ball on the tube again. The stop ball may be inflated, for example with compressed air from an airgun at the end of a tube supplying compressed air. The inflated stop ball may then be moved, slided, in the axial direction along the tube, because air is introduced between the tube and the attachment means (140). The stop ball is inflated as long as air is supplied into it because naturally air leaks out from the first opening (120) and the third opening (130). It is during this air supply that the stop ball is inflated and can be moved. Once no more air is supplied to the stop ball, then the attachment means (140) attaches to the tube with the help of the clamping means (180).

Figure 6:
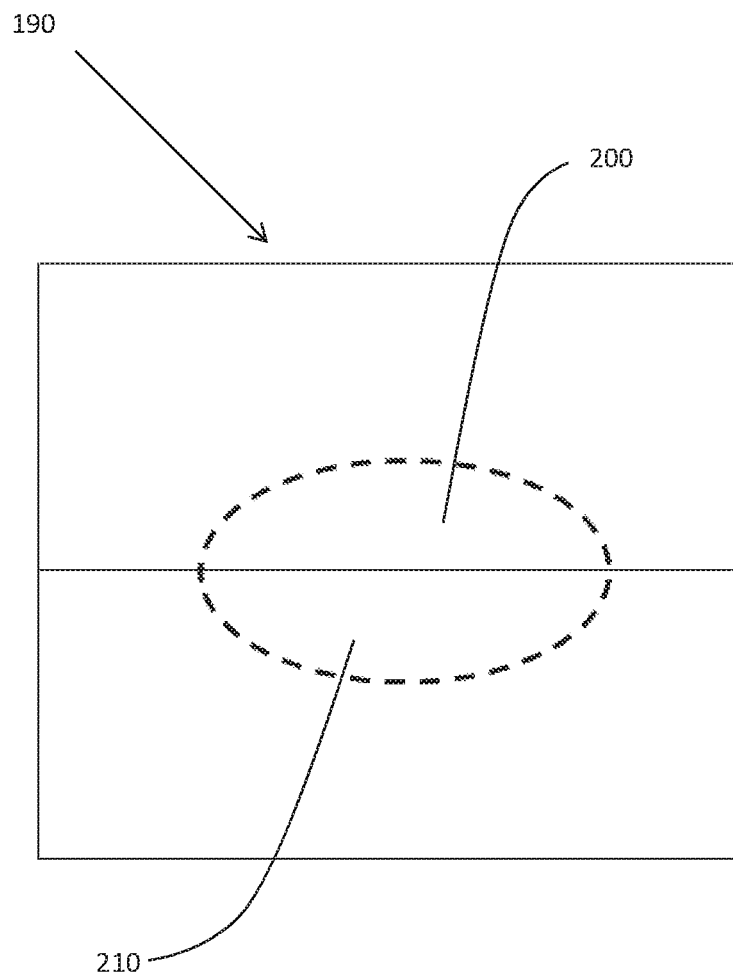
FIG. 6 illustrates a tool configured for moulding the stop ball according to any one of the disclosed embodiments.

According to one embodiment illustrated by FIG. 6, a tool (190) configured for moulding the stop ball according to any one of the disclosed embodiments herein is provided. The tool (190) comprises two volumes (200, 210), each volume (200 and 210) being adapted to be pulled out from the first opening (120) and the third opening (130), respectively, (as shown in FIGS. 1-4) for injection moulding the stop ball in one single moulding step. The material of the hollow body (100) is flexible, allowing a flexibility of over 100 percent. The stop ball is preferably able to fit tight onto a tube with a diameter of 9.5 millimetres and extend up to a tube with a diameter of 18 millimetres. According to one embodiment, the material for the hollow body (100) of the stop ball is chloroprene with a hardness shore of 50. This choice of material and flexibility achieves technically a stop ball that can be moulded in one step and a stop ball that is not too hard or too soft and achieves stopping, dampening, the tube being reeled up without damaging the hose reel or the tube. This flexibility allows each volume (200 and 210) of the tool (190) for moulding the stop ball to be pulled out the first opening (120) and the third opening (130), respectively, when the mould is opened to take out the moulded stop ball.

According to at least one embodiment disclosed herein, a stop ball is provided that does not cause injury to a person using it. At least one embodiment provides a stop ball that is inexpensive to manufacture, is easy to manufacture, and is robust. At least one embodiment provides a stop ball that is a good, functional, and reliable stop, with good dampening qualities. At least one embodiment provides a method for attaching the stop ball to a hose.

It will be apparent to those skilled in the art that various modifications and variations can be made to the stop ball and the method for attaching the stop ball to a tube. Other embodiments will be apparent to those skilled in the art from consideration of the specification and practice of the disclosed stop ball. It is intended that the specification and examples be considered as exemplary only, with a true scope being indicated by the following claims and their equivalents.

LIST OF ELEMENTS 100 hollow body
102 outer part of hollow body
120 first opening
122 first diameter
130 third opening
132 third diameter
140 attachment means
142 area
144 flange
150 second opening
152 second diameter
160 radial opening
170 structural configurations
180 clamping means
510 inserting hose
520 puling attachment means
530 clamping
540 inflating ball
550 moving ball
560 deflating ball

The invention claimed is:

1. A stop ball for a tube for fluid or energy, the stop ball comprising a singular hollow body, the hollow body comprising and being integral with:
   a first opening for the tube, the first opening having a first diameter;
   an attachment surface for attaching the stop ball to the tube, the attachment surface comprising a second opening for the tube;
   a third opening for the tube, the third opening having a third diameter;
   wherein the second opening has a second diameter, the second diameter being smaller than at least one of the first diameter and the third diameter;
   wherein the third diameter is larger than each of the first diameter and the second diameter;
   wherein the hollow body is flexible, allowing a flexibility of over 100 percent; and
   wherein the hollow body, between an outer side of the hollow body and the attachment surface, extends inwardly and outwardly in an axial direction of the stop ball.

2. The stop ball according to claim 1, wherein the attachment surface is at least partially inside the hollow body.

3. The stop ball according to claim 1, wherein the attachment surface comprises an area for radial clamping of the area on to the tube.

4. The stop ball according to claim 3, wherein the area has a constant diameter followed by a flange.

5. The stop ball according to claim 1, wherein the hollow body comprises a radial opening.

6. The stop ball according to claim 1, wherein the hollow body comprises structural configurations to strengthen the hollow body.

7. The stop ball according to claim 1, wherein the stop ball is attached to the attachment surface via a cable tie, a hose clamp, an elastic, a mechanical clamp or a tie.

8. The stop ball according to claim 1, wherein the hollow body is substantially a cylindrical body, a cylindrical body with rounded edges, a sphere-shaped body, a ball, a balloon or round.

9. A method for attaching a stop ball according to claim 1 to a tube for fluid or energy, the method comprising:
   inserting the tube through all three openings;
   pulling the attachment surface at least partly out of the hollow body; and clamping the attachment surface onto the tube.

10. The method according to claim 9, the method comprising using at least one of the group of a cable tie, hose clamp, an elastic, mechanical clamp, and tie for clamping the attachment surface onto the tube.

11. The method according to claim 9, the method comprising:
   inflating the hollow body by supplying compressed air directed into an opening in the hollow body;
   moving the stop ball along the tube while the hollow body is inflated; and
   deflating the hollow body by removing the supply of compressed air directed into the hollow body to cause a re-clamping friction at the attachment surface of the stop ball on the tube.

12. A tool configured to mould the stop ball according to claim 1, the tool comprising two volumes, each volume being adapted to be pulled out from the first opening and the third opening, respectively, for injection moulding the stop ball in one single moulding step.

* * * * *